US009342888B2

(12) United States Patent
Menashe et al.

(10) Patent No.: US 9,342,888 B2
(45) Date of Patent: May 17, 2016

(54) SYSTEM AND METHOD FOR MAPPING, LOCALIZATION AND POSE CORRECTION OF A VEHICLE BASED ON IMAGES

(71) Applicant: Honda Motor Co., Ltd., Tokyo (JP)

(72) Inventors: Jacob Menashe, Austin, TX (US); Aniket Murarka, San Jose, CA (US); Ananth Ranganathan, Santa Clara, CA (US)

(73) Assignee: Honda Motor Co., Ltd., Tokyo (JP)

(*) Notice: Subject to any disclaimer, the term of this patent is extended or adjusted under 35 U.S.C. 154(b) by 112 days.

(21) Appl. No.: 14/458,286

(22) Filed: Aug. 13, 2014

(65) Prior Publication Data

US 2015/0228077 A1 Aug. 13, 2015

Related U.S. Application Data

(60) Provisional application No. 61/937,533, filed on Feb. 8, 2014.

(51) Int. Cl.
G06K 9/00 (2006.01)
G06T 7/00 (2006.01)
G06K 9/68 (2006.01)

(52) U.S. Cl.
CPC .......... *G06T 7/0044* (2013.01); *G06K 9/00664* (2013.01); *G06K 9/6857* (2013.01); *G06T 7/0022* (2013.01); *G06T 7/0075* (2013.01);
(Continued)

(58) Field of Classification Search
None
See application file for complete search history.

(56) References Cited

U.S. PATENT DOCUMENTS 5,961,571 A 10/1999 Gorr et al.
6,272,231 B1 * 8/2001 Maurer .............. G06K 9/00228
382/103

(Continued)

FOREIGN PATENT DOCUMENTS

DE 102010033479 2/2012
WO 2013/045935 4/2013

OTHER PUBLICATIONS

Paper: Napier et al., Mobile Robotics Group University of Oxford: "Real-Time Bounded-Error Pose Estimation for Road Vehicles Using Vision", Intelligent Transportation Systems (ITSC), 2010 13th International IEEE Conference on Intelligent Transportation Systems, pp. 1141-1146.

(Continued)

*Primary Examiner* — Tahmina Ansari
(74) *Attorney, Agent, or Firm* — Rankin, Hill & Clark LLP

(57) ABSTRACT

A system and method for mapping, localization and pose correction including, determining a current position of a vehicle along a travel route and a set of currently observable landmarks along the travel route relative to the current position, the set of currently observable landmarks extracted from one or more stereo images obtained from an imaging device, and querying a survey landmark database to identify a subset of surveyed landmarks relative to the current position of the vehicle. The method including determining one or more two-dimensional transform estimates between the set of currently observable landmarks and the subset of surveyed landmarks and identifying a best transform estimate from the one or more two-dimensional transform estimates that minimizes distances between the set of currently observable landmarks and the subset of surveyed landmarks. The method including correcting a pose of the vehicle based on the best transform estimate.

12 Claims, 13 Drawing Sheets

(52) U.S. Cl.
CPC ............... *G06T2207/10012* (2013.01); *G06T 2207/30248* (2013.01)

(56) References Cited

U.S. PATENT DOCUMENTS

| | | | |
|---|---|---|---|
| 6,516,267 | B1 | 2/2003 | Cherveny et al. |
| 7,177,737 | B2 | 2/2007 | Karlsson et al. |
| 8,073,287 | B1 * | 12/2011 | Wechsler ............ G06K 9/00281 359/306 |
| 8,174,568 | B2 | 5/2012 | Samarasekera et al. |
| 8,442,791 | B2 * | 5/2013 | Stahlin ................... G01C 21/30 340/995.25 |
| 9,218,003 | B2 * | 12/2015 | Fong .................... G05D 1/0274 |
| 2008/0260207 | A1 * | 10/2008 | Nagaoka ................ G06T 7/0002 382/103 |
| 2011/0316980 | A1 * | 12/2011 | Dubbelman ......... G06K 9/6211 348/47 |
| 2012/0121161 | A1 * | 5/2012 | Eade et al. ........... G09B 29/007 382/153 |
| 2012/0122486 | A1 | 5/2012 | Day et al. |
| 2015/0228077 | A1 * | 8/2015 | Menashe ............... G06T 7/0044 382/103 |

OTHER PUBLICATIONS

Search Report of DE Application No. 10 2015 201 951.9 dated Nov. 16, 2015, 11 pages.

* cited by examiner

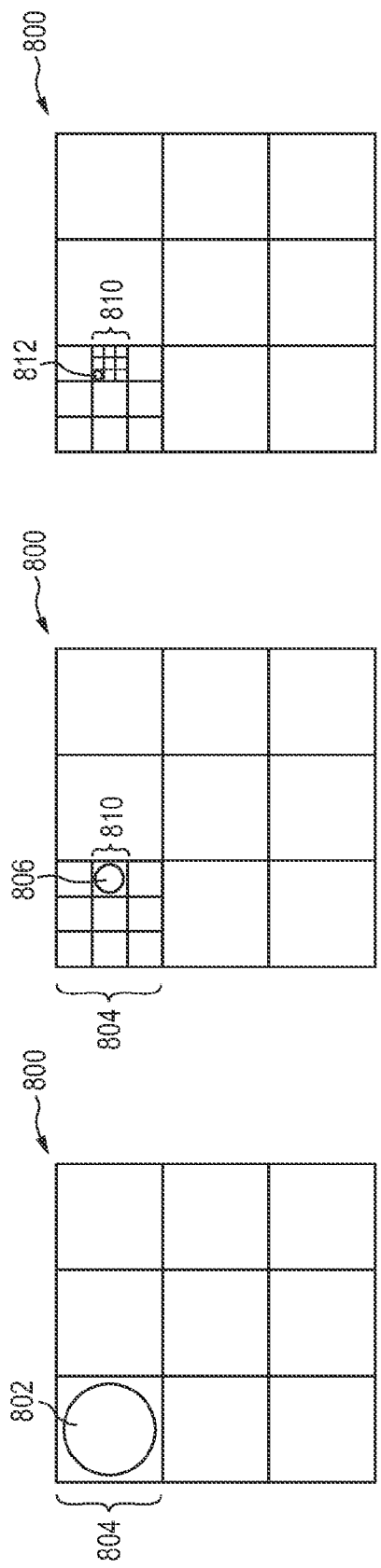
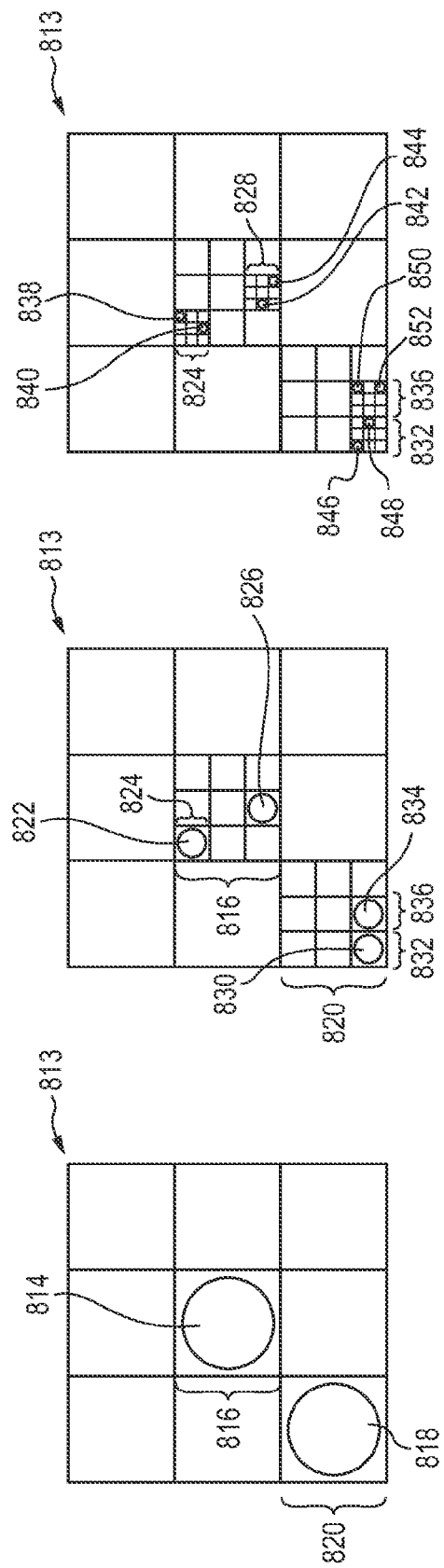

| | |
|---|---|
| BN1 | 2 |
| BN5 | 5 |
| BN3 | 6 |
| BN6 | 20 |
| BN2 | 21 |
| BN4 | 22 |

SYSTEM AND METHOD FOR MAPPING, LOCALIZATION AND POSE CORRECTION OF A VEHICLE BASED ON IMAGES

RELATED APPLICATIONS

This application claims priority to U.S. Provisional Application Ser. No. 61/937,533 filed on Feb. 8, 2014, which is expressly incorporated herein by reference.

BACKGROUND

An important ability for an intelligent agent (e.g., a vehicle, a robot) trying to localize in the world, is recognizing its location. Generally, the agent determines its location given only its local sensor information and some model of the world. Typically, its own local sensor information provides some measurement of its location, but this measurement is often imprecise. An intelligent vehicle equipped with a camera can keep track of its position relative to a given starting point in space using visual odometry. However, visual odometry can provide poses that tend to drift. Reliable visual odometry allows the vehicle to estimate its position more precisely.

BRIEF DESCRIPTION

According to one aspect, a computer-implemented method for mapping, localization and pose correction includes, determining a current position of a vehicle along a travel route and a set of currently observable landmarks along the travel route relative to the current position. The set of currently observable landmarks are extracted from one or more stereo images obtained from an imaging device. The method includes querying a survey landmark database to identify a subset of surveyed landmarks relative to the current position of the vehicle, the survey landmark database comprising a set of surveyed landmarks previously stored, and determining one or more two-dimensional transform estimates between the set of currently observable landmarks and the subset of surveyed landmarks. The method includes identifying a best transform estimate from the one or more two-dimensional transform estimates that minimizes distances between the set of currently observable landmarks and the subset of surveyed landmarks and correcting a pose of the vehicle based on the best transform estimate.

According to another aspect, a system for mapping, localization and pose correction includes, a processor and a visual odometry module that causes the processor to determine a current position of a vehicle along a travel route and a set of currently observable landmarks along the travel route relative to the current position. The set of currently observable landmarks are extracted from one or more stereo images obtained from an imaging device communicatively coupled to the processor. A localization module causes the processor to query a survey landmark database communicatively coupled to the processor to retrieve a subset of surveyed landmarks relative to the current position of the vehicle, the survey landmark database including a set of surveyed landmarks previously stored. A pose correction module causes the processor to determine one or more two-dimensional transform estimates between the set of currently observable landmarks and the subset of surveyed landmarks, identify a best transform estimate from the one or more two-dimensional transform estimates that minimizes distances between the set of currently observable landmarks and the subset of surveyed landmarks and correct a pose of the vehicle based on the best transform estimate.

According to a further aspect, a non-transitory computer readable medium comprising instructions that when executed by a processor perform a method for mapping, localization and pose correction, including determining a current position of a vehicle along a travel route and a set of currently observable landmarks along the travel route relative to the current position. The set of currently observable landmarks are extracted from one or more stereo images obtained from an imaging device. The method including receiving a subset of surveyed landmarks from a survey landmark database based on a query identifying the current position, the query executed at the survey landmark database, the survey landmark database including a set of surveyed landmarks previously stored, and determining one or more two-dimensional transform estimates between the set of currently observable landmarks and the subset of surveyed landmarks. The method including identifying a best transform estimate from the one or more two-dimensional transform estimates that minimizes distances between the set of currently observable landmarks and the subset of surveyed landmarks and correcting a pose of the vehicle based on the best transform estimate.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 8A is a schematic diagram of an exemplary grid search with a branch factor of one for a best estimate at a first depth level in accordance with one aspect;

FIG. 8B is a schematic diagram of an exemplary grid search with a branch factor of one for a best estimate at a second depth level after the first depth level of FIG. 8A in accordance with one aspect;

FIG. 8C is a schematic diagram of an exemplary grid search with a branch factor of one for a best estimate at a third depth level after the second depth level of FIG. 8B accordance with one aspect;

FIG. 8D is a schematic diagram of an exemplary grid search with a branch factor of two for more than one best estimate at a first depth level in accordance with one aspect;

FIG. 8E is a schematic diagram of an exemplary grid search with a branch factor of two for more than one best estimate at a second depth level after the first depth level of FIG. 8D in accordance with one aspect;

FIG. 8F is a schematic diagram of an exemplary grid search a branch factor of two for more than one best estimate at a third depth level after the second depth level of FIG. 8E in accordance with one aspect;

DETAILED DESCRIPTION

Figure 1:
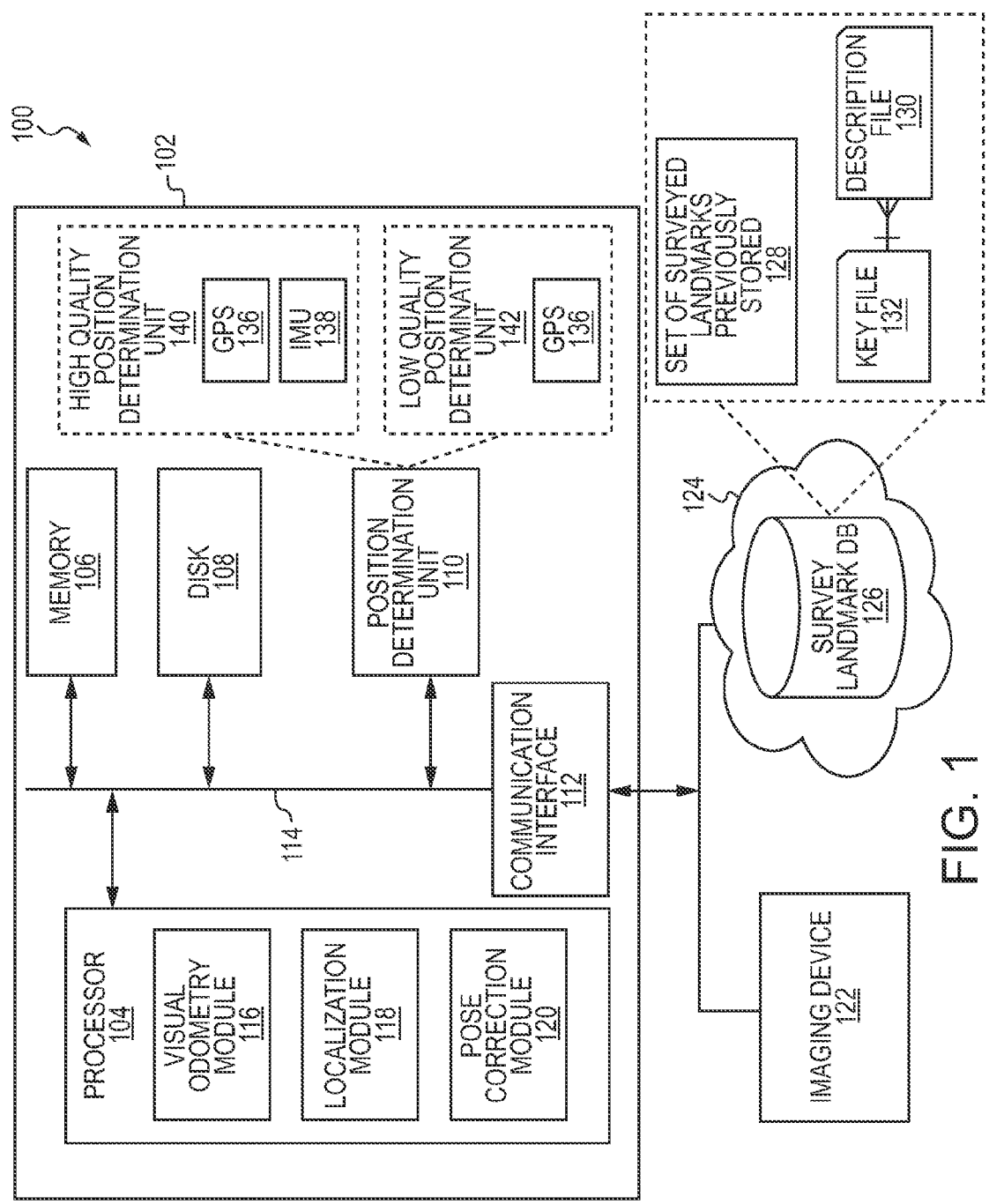
FIG. 1 is a schematic diagram of an exemplary system for mapping, localization and pose correction in accordance with one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or into organized into different architectures.

A "bus," as used herein, refers to an interconnected architecture that is operably connected to other computer components inside a computer or between computers. The bus may transfer data between the computer components. Accordingly, the bus may communicate with various devices, modules, logics, and peripherals using other buses. The bus may be a single internal bus interconnect architecture and/or other bus or mesh architectures (e.g., external). The bus may be a memory bus, a memory controller, a peripheral bus, an external bus, a crossbar switch, and/or a local bus, among others. In some embodiments, the bus may be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, portable device, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database," as used herein can refer to table, a set of tables, a set of data stores (e.g., disks) and/or methods for accessing and/or manipulating those data stores.

A "memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications may be sent and/or received. An operable connection may include a physical interface, a data interface, and/or an electrical interface.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). Additionally, the term "vehicle" can refer to an autonomous vehicle and/or self-driving vehicle powered by any form of energy. The autonomous vehicle may or may not carry one or more human occupants A "vehicle system," as used herein can include, but are not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. System Overview

Generally, the systems and methods disclosed herein provide a stereo-based mapping and localization method for pose correction of an agent (e.g., a vehicle, an autonomous vehicle, a robot, a user with a portable device) travelling along a route. Utilizing a lightweight 3D local map of the agent's environment built with dense stereo depth data, two sets of landmarks and refined transform estimates, pose correction of the agent's path is accurate and fast. The methods and systems described herein as including two operating modes: surveying mode and localization mode. However, the functions and components of the two modes can be reorganized into different architectures and/or implemented in other architectures, modes, and embodiments.

Referring now to the drawings, where the showings are for purposes of illustrating one or more exemplary embodiments and not for purposes of limiting the same, FIG. 1 illustrates a schematic diagram of an exemplary system 100 for mapping, localization and pose correction in accordance with one aspect. The components of the system 100, as well as the components of other systems, hardware architectures, and software architectures discussed herein, may be combined, omitted, or organized into different architecture for various embodiments. Further, the system 100 and/or one or more components of the system 100, can in some embodiments, be implemented with a vehicle (not shown), one or more vehicle systems (not shown) or a portable device (not shown). Moreover, it is understood that the system 100 and/or one or more components of the system 100, can in some embodiments, be used to implement a surveying mode or a localization mode, as will be discussed in more detail herein.

In the illustrated embodiment of FIG. 1, the system 100 includes a computing device 102 with provisions for processing, communicating, and interacting with various components of the system 100. Generally, the computer 102 includes a processor 104, a memory 106, a disk 108, a position determination unit 110, and a communication interface 112 which are each operably connected for computer communication via a bus 114. The computer 102 can be integrated with or associated with a vehicle (not shown), for example an ECU, vehicle head unit, and imaging system, among others. The communication interface 112 provides software and hardware to facilitate data input and output between the components of the computing device 102 and other components, networks, and data sources, which will be described herein. Additionally, as will be discussed in further detail with the systems and the methods discussed herein, the processor 104 includes a visual odometry module 116, a localization module 118 and a pose correction module 120.

The computing device 102 is also operatively connected for computer communication to an imaging device 122, a network 124, and a survey landmark database 126 (DB). It is understood that the connection to the imaging device 122, the network 124 and the survey landmark DB 126 can be facilitated in various ways, for example, through a network connection (e.g., wired or wireless) from the communication interface 112, a cellular data network from a portable device (not shown) connected to the computing device 102, a vehicle to vehicle ad-hoc network (not shown), an in-vehicle network, among others.

The imaging device 122 can include one or more cameras or other imaging devices and sensing devices. For example, the imaging device 122 can be one or more stereo cameras, three-dimensional cameras, remote sensing devices (e.g., LIDAR, lasers, sensors), among others. In one embodiment, the imaging device 122 acquires stereo images (e.g., a left image, a right image) of an image scene (e.g., a scene of a travel route, a road, the environment surrounding the vehicle). The network 124 is, for example, a data network, the Internet, a wide area network or a local area network. The network 124 serves as a communication medium to various remote devices (e.g., web servers, remote servers, application servers, intermediary servers, client machines, other portable devices).

In FIG. 1, the network 124 includes the survey landmark DB 126. The survey landmark DB 126 is built for landmark matching and localization, which will be discussed in more detail herein. The survey landmark DB 126 can include a set of surveyed landmarks previously stored 128 (e.g., $L_i \ldots L_n$). Further, the survey landmark DB 126 can include a description file 130 and a key file 132. The key file contains the centroid position for each landmark (e.g., $L_i \ldots L_n$). The description file 130 contains additional stored information about each landmark. The description file 130 and the key file 132 will be described in more detail herein with reference to FIG. 5.

Generally, the survey landmark DB 126 is built utilizing a position determination unit, for example the position determination unit 110 in FIG. 1. The position determination unit 110, in some embodiments, can include a high quality position determination unit 140 with, for example a global positioning system (GPS) 136 and/or an inertial measurement unit (IMU) 138. The high quality position determination unit 140 can be a high quality and expensive device for determining a vehicle global pose. In some embodiments, the high quality position determination unit 140 has a position accuracy of 10-15 centimeters. The high quality position determination unit 140 is utilized during surveying mode to obtain a vehicle global pose.

In another embodiment, the position determination unit 110 can include a low quality position determination unit 142 with, for example, a global positioning system (GPS) 136, or another type of sensor or technology to determine a two-dimensional (2D) vehicle pose. The low quality position determination unit 142 can be less expensive device for determining a vehicle global pose. In some embodiments, the low quality position determination unit 142 is a GPS device in a standard vehicle navigation system and/or a portable device. In some embodiments, the low quality position determination unit 142 has a position accuracy of 10-15 meters. The low quality position determination unit 142 is utilized during localization mode to obtain a relative vehicle pose in two-dimensions.

As mentioned above, it is understood that the position determination unit 110 can be associated with another device, for example a portable device in the vehicle (not shown). Further, the position and global pose information could be obtained from other devices, for example, a visual odometry system (e.g., the visual odometry module 116) or through a network, for example the network 124. The position obtained from the position determination unit 110 can be used during a surveying mode or a localization mode, which will be discussed in further detail herein.

II. Surveying Mode

During surveying mode, landmarks are extracted along a current travel route of a vehicle and saved to the survey landmark DB 126. The surveying mode can be implemented as a service from provider (e.g., a third party) or implemented on the consumer side (e.g., the agent to be localized). The survey landmark DB 126 is used during localization. Surveying mode used to build the survey landmark database (DB) 126 of FIG. 1 by a third-party service will now be described. In brief, during the surveying mode process, a local three-dimensional (3D) map is built of the surrounding environment of a vehicle by combining dense stereo disparity images over multiple frames. Objects (e.g., landmarks) are extracted from the local 3D map by identifying and removing the ground surface. These objects and information about these objects are then saved to disk (e.g., the survey landmark DB 126 of FIG. 1) for further use in localization.

Figure 2:
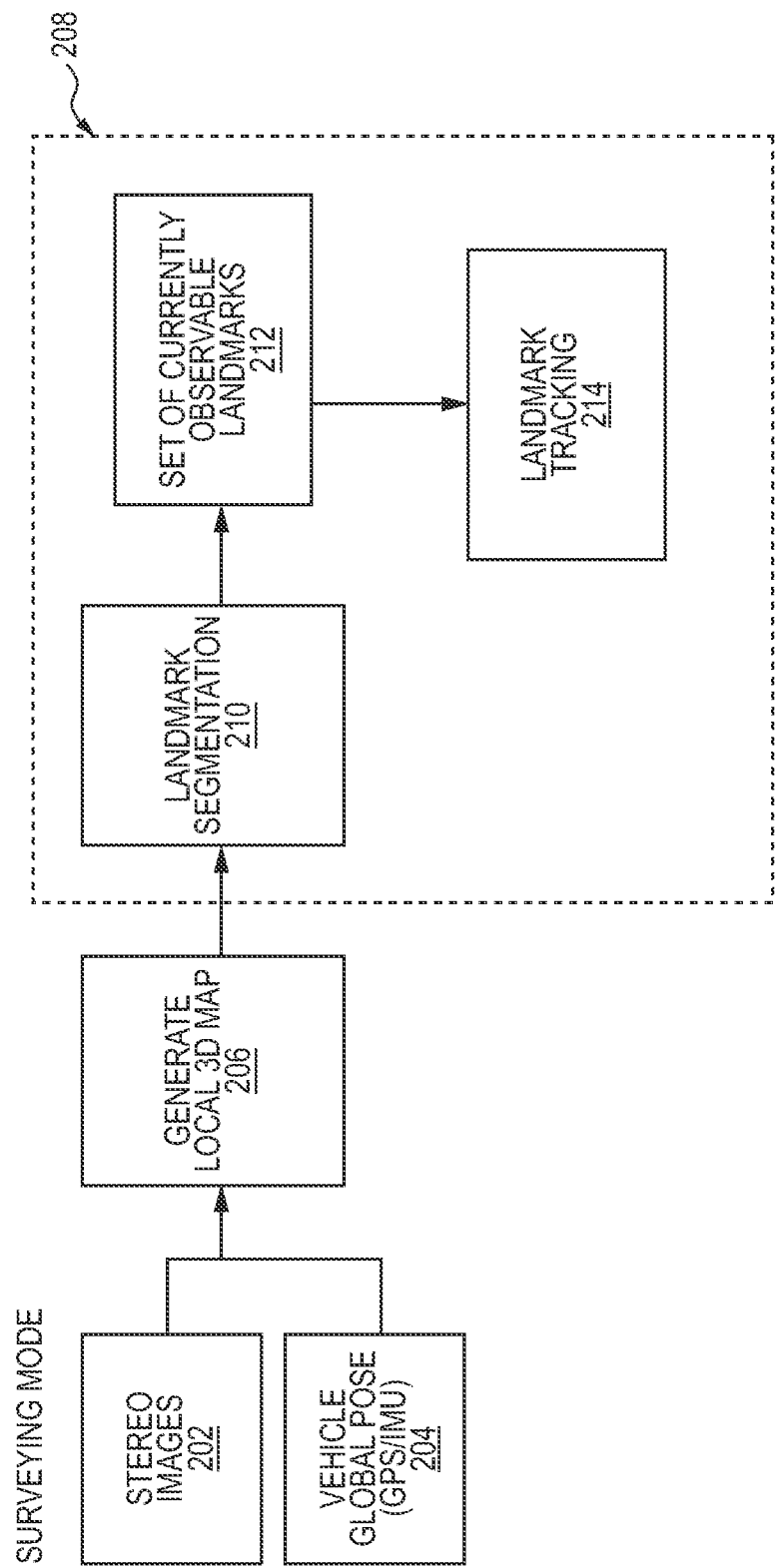
FIG. 2 is a schematic diagram of exemplary data flow of a surveying mode provided by a service in accordance with one aspect.

FIG. 2 is a schematic diagram of exemplary data flow of a surveying mode provided by a service in accordance with one aspect. In this embodiment, a survey landmark DB is built as a service from a provider (e.g., a third party). Thus, during localization, a computing device can access data from the survey landmark DB from the provider. In this embodiment, the survey landmark DB could be provided via a network, the Internet, the cloud and maintained by the provider. For example, referring to FIG. 1, the computing device 102 can access the survey landmark DB 126 via the network 124, where the survey landmark DB 126 can be maintained by a third-party provider. It is understood that the components of FIG. 1 can be used to facilitate and execute the data flow blocks shown in FIG. 2.

Referring again to FIG. 2, stereo images 202 (e.g., acquired from the imaging device 122 of FIG. 1) and a vehicle global pose 204 (e.g., determined by the position determination unit 110) are used as inputs to generate a local three-dimensional (3D) map 206. In one embodiment, during surveying mode the vehicle global pose 204 is determined by the high quality position determination unit 140 (e.g., GPS 136, IMU 138). In one embodiment, the stereo images 202 can also include sensor data, for example camera tracking data, camera trajectory data, from, for example, the imaging device 122. The local 3D map 206 provides a view of a vehicle's external environment and is centered on the vehicle (i.e., it moves with the vehicle).

In one embodiment, the local 3D map 206 is built using a volumetric and key-frame based approach. In this embodiment, a volumetric representation of the stereo images 202 is generated. The current frame is designated a key-frame if there is sufficient camera motion between the frame and the previous key-frame. The relative pose between key-frames is estimated. In one embodiment, the relative pose is estimated using KLT trackers to track Harris corner features in the stereo image (e.g., left and right images). The features are matched between the left and right images using Normalized SSD (Sum of Squared Differences) and the 3D positions of the features are computed based on their disparity. A 3-point algorithm embedded in RANSAC can be used to remove outliers and find feature matches consistent with a motion hypothesis. The inliers are processed using non-linear optimization to find an enhanced pose estimate of the camera frame and find a new set of inliers. The last key-frames are passed through a Local Bundle Adjustment (LBA) module (not shown) to improve the relative pose estimates of the key-frames and ensure a locally metric map around the current key-frame's position.

The key-frames and their poses are used to build the local 3D map 206 of the environment surrounding the vehicle. In particular, to generate the local 3D map 206, for each key-frame a dense stereo disparity/depth image is computed using a variant of a Semi-Global Matching Algorithm with SAD Block Matching on a weighted combination of the original stereo images 202 and a Sobel Filtered image. Additionally, Scanline Optimization can be performed, for example, in only two directions as opposed to eight or 16 to save on computation time.

The local 3D map 206, centered on the vehicle, is generated and/or updated at each key-frame by combining the dense depth images over multiple key-frames making use of the key-frame poses to register the depth images into a single coordinate frame. In particular, in one embodiment, a 3D occupancy grid is used to build the local 3D map and remove spurious disparity values in the images. Combining multiple depth images and using a 3D occupancy grid provides a fast and effective way to handle outliers and missing depths thereby generating the local 3D map 206 in an accurate manner. The local 3D map 206 is utilized for landmark segmentation and tracking 208, which will be described in detail below.

A. Landmark Segmentation

The 3D local map 206 is processed for landmark segmentation 210 to remove the ground surface, such as the roads and sidewalks, and extract objects (e.g., landmarks), such as trees and traffic signs, in the vehicle's environment. The objects are filtered and result in a set of currently observable landmarks 212. The set of currently observable landmarks 212 are utilized for landmark tracking 214 to track the landmarks across time.

Landmark segmentation 210 can be performed in various ways. In one embodiment, the ground surface is extracted using a region growing algorithm that creates clusters based on ground and object heights. In this embodiment, the region growing algorithm operates on vertical voxel columns in the 3D occupancy grid (discussed above) and classifies the vertical voxel columns as ground or as an object. The region growing algorithm uses the vehicle's current location (e.g., the vehicle global pose 204), which is known to be on the ground, and classifies all voxels columns occupied by the vehicle as ground. The classified columns are added to a list of voxel columns for future examination. The height of each voxel column occupied by the vehicle is also computed. The height is the discretized height of the highest occupied voxel below the vehicle or, in case that is unknown, the height is the estimated discretized height of the ground using known dimensions of the vehicle and camera calibration information.

The region growing algorithm examines voxel columns neighboring the vehicle columns and computes their height. Specifically, the voxel column list is popped and the neighbors of the popped column are examined. The height of a voxel column is the height of the ground at that position or if the space is occupied by an object, then the height of that object. In the case of an overhanging object, where the overhang is higher than the vehicle roof, we use the ground height as the height of the voxel column. Columns with no data have their heights filled in using neighboring column heights.

The neighboring voxel columns are classified as ground if the height of the neighboring voxel columns is within a threshold of a popped column. If the height differs by a large amount then the voxels columns are left unclassified. The voxel columns labeled as ground are added to the column list so that neighbors of said voxel columns are also examined. Proceeding in this manner, the region growing algorithm sweeps through the 3D occupancy grid computing voxel column heights and classifying the voxel columns based on height differences.

After the region growing algorithm process ends, all unclassified voxel columns are classified as objects. All voxels belonging to objects are extracted, using for example, a connected components algorithm to generate a list of voxels belonging to an object. The connected components algorithm initializes a new object list with an occupied voxel in a column classified as an object. The connected components algorithm identifies all of the occupied voxel's neighboring voxels that are also occupied. If the neighboring voxel column is classified as an object, it is added to the object list. If the column is classified as ground, the voxel is added to the object list only if its height is greater than the height of its column (e.g., indicating that it is an overhanging object). The connected components algorithm examines the neighbors of the newly added voxels until all connected voxels have been examined. An object is a list of connected occupied voxels.

The objects are filtered based on height and size. If an object is too short or if the cross-sectional size of the object's bounding box is too large, the object is removed from the object list. Filtering based on height removes small objects that might be hard to observe consistently or for objects for which we may not have sufficient information. Additionally, filtering based on size results in objects with a small base that are easier to use for localization. Further, filtering removes most parked vehicles, which can confuse the pose correction process by providing false landmarks. This final set of objects is the set of currently observable landmarks 212 in the 3D local map 206. The set of currently observable landmarks 212 can include a list of voxels of the landmark and start and end points associated with the landmark. The set of currently observable landmarks 212 can be stored, for example, in the memory 106 and/or the disk 108 of FIG. 1. Alternatively, the set of currently observable landmarks 212 can be stored in remote database, for example, accessed via the network 124.

B. Landmark Tracking

The set of currently observable landmarks 212 are tracked over time by a landmark tracking 214 process. Landmark tracking 214 can be performed in the surveying mode and the localization mode of the methods and systems discussed herein. In surveying mode, landmark tracking 214 keeps track of which landmarks have been written to disk (e.g., to the survey landmark DB 126). In localization mode, landmark tracking 214 keeps track of landmarks over a larger distance than the size of the local 3D map 206.

Figure 5:
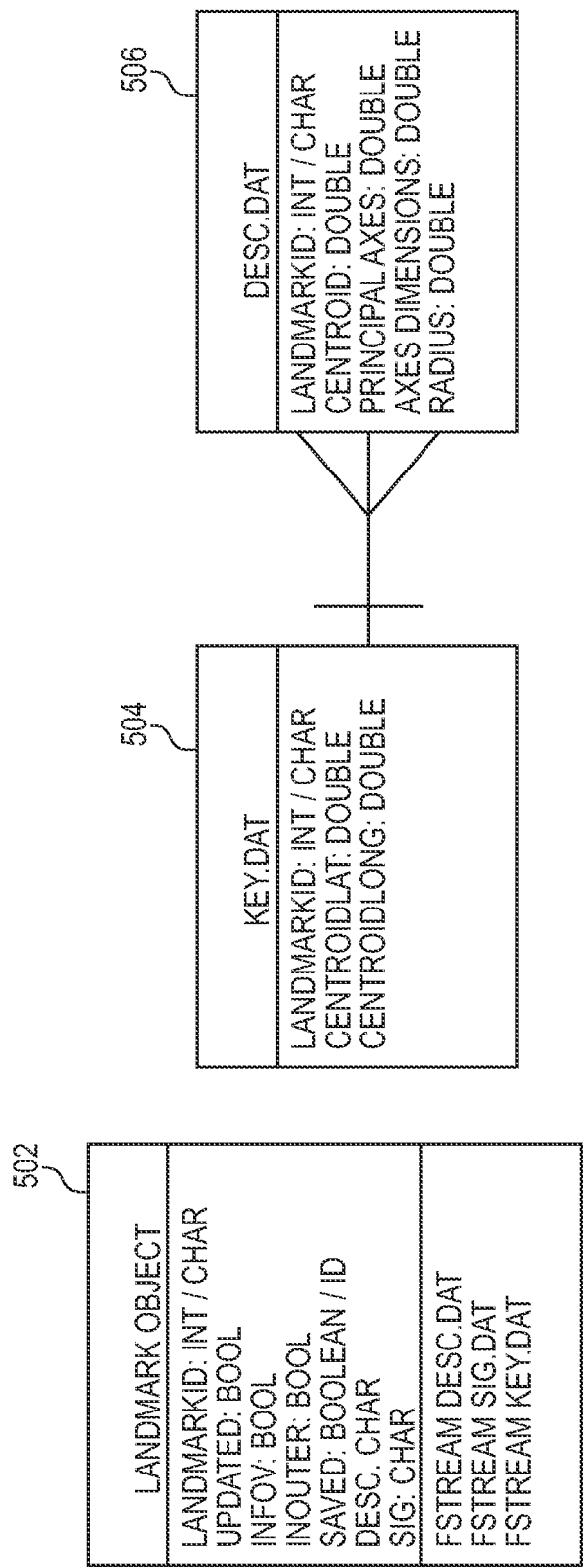
FIG. 5 is a UML diagram of exemplary objects, classes, functions and files in accordance with one aspect.

To track the landmarks, the current set of observable landmarks 212 are matched to a set of existing landmarks in the survey landmark DB 216. In particular, the set of existing landmarks are the set of surveyed landmarks previously stored 128. Each landmark (e.g., the set of surveyed landmarks previously stored 128) in the survey landmark DB 216 includes associated information. For example, in one embodiment, each landmark has the following attributes: (i) ID: A unique landmark ID; (ii) Updated: Whether the landmark was updated in the current keyframe; (iii) InFOV: Whether the landmark is in the camera's field of view; (iv) InOuter: Whether the landmark is in the outer region of the local 3D map; (v) Saved: Whether the landmark has been saved to disk. FIG. 5 illustrates a UML diagram of an exemplary landmark object 502 (e.g., a landmark in the set of surveyed landmarks previously stored 128) including attributes, attribute types and associated functions. The UML diagram of FIG. 5 is exemplary in nature and it is understood that other attributes, attribute types, and functions can also be implemented with the landmark object 502.

As mentioned above, landmark tracking 214 matches the set of currently observable landmarks 212 to the set of surveyed landmarks previously stored 128 in the survey landmark DB 216. In one embodiment, positions of each landmark (e.g., $L_i \ldots L_n$) in the set of surveyed landmarks previously stored 128 are converted to the current local 3D map 206 coordinate frame prior to matching. The matching can be performed by constructing a Bipartite Graph with the set of currently observable landmarks 212 and the set of surveyed landmarks previously stored 128 forming two disjoint sets of vertices. An edge in the graph is added between a current landmark and an existing landmark if the two landmark volume's overlap. Specifically, if the sets of voxels comprising the two landmarks intersect, based on the Bipartite Graph, equivalence classes between the set of currently observable landmarks 212 and the set of surveyed landmarks previously stored 128 are identified and classified based on the number of existing and current landmarks in each. The set of surveyed landmarks previously stored 128 is updated based on the type of equivalence class.

The types of equivalence classes and their associated update will now be described. In a one current and one existing equivalence class, a match has been found. Thus, the attributes of the existing landmark are updated as follows: (i) ID: No change; (ii) Updated: Set to TRUE if the current and existing landmarks differ in their voxel lists or the end points in the voxels; (iii) InFOV: Set to TRUE if the current landmark is in the camera's field of view; (iv) InOuter: Set to TRUE if the current landmark is in the outer region of the local 3D map; (v) Saved: Set to value of existing landmark.

In a one current and many existing equivalence class, several existing landmarks merge into a single current landmark, as can happen when new depth data becomes available. The voxel and point list of the existing landmark with the maximum overlap is updated to the current landmark's voxel list, and its attributes are updated as in the case of a one current and one existing equivalence class, discussed above. The rest of the existing landmarks are deleted.

In a many current and one existing equivalence class, several current landmarks spawn from a single existing landmark, as can happen when previously occupied voxels become free space or when the segmentation changes. In this case, the voxel and point list of the existing landmark with the maximum overlap is updated to the current landmark's voxel list and the attributes are updated as in the case of a one current and one existing equivalence class, discussed above. The remaining current landmarks are assigned a new unique landmark ID and added to the list of existing landmarks with their attributes being updated similarly. The Saved attribute is set to FALSE.

In a many current and many existing equivalence class, each current landmark is matched with an existing landmark with a maximum overlap. The current landmark is assigned the existing landmark's ID, if the ID has not already been assigned to another existing landmark. The remaining updates are done as in the case of a one current and one existing equivalence class, discussed above. In case the existing ID has already been assigned to a current landmark, then a new unique ID is generated for the current landmark. The remaining updates are done as in case as in the case of a one current and one existing equivalence class, discussed above, however, the attribute Saved is set to FALSE.

In a one current and zero existing equivalence class, the current landmark is added to the list of existing landmarks and assigned a new unique ID. The attribute Updated is set to TRUE and the attribute Saved is set to False. The remaining updates are done as in the case of a one current and one existing equivalence class, discussed above. In a zero current and one existing equivalence class, the existing landmark is left as is except for the attribute Updated, which is set to FALSE.

Accordingly, at the end of the matching process for landmark segmentation and tracking 208, the set of surveyed landmarks previously stored 128 and their attributes have been updated with current landmarks (e.g., from the set of currently observable landmarks 212).

C. Computing Landmark Properties and Saving to Disk

Localization involves matching a set of currently observable landmarks to the stored landmarks (i.e., the set of surveyed landmarks previously stored 128). To aid the matching process, several properties of the stored landmarks are computed, for example, centroid, principal axes, and dimensions. Before the properties are computed, the landmarks can be modeled at a finer resolution than the local 3D occupancy grid to compute the properties more accurately. In one embodiment, the properties are only computed for new landmarks (i.e., those with a new ID) or for those which have the attribute Updated set to TRUE and the attribute, Saved set to False.

To compute the properties, in one embodiment, the landmark is modeled using signed distance fields. A new 3D grid, with a finer resolution than the 3D occupancy grid, is created enclosing the landmark. For each start point associated with the landmark, a ray is cast to its end point. The voxel in which the endpoint falls is assigned a distance value of zero. Voxels along the ray and between the start point and the endpoint voxel are assigned a positive distance, measuring how far the voxel is from the endpoint. Similarly, voxels along the ray that are beyond the endpoint voxel (going away from the start point) are assigned negative distances. Since this process is executed for each start-end point pair, a voxel can be assigned multiple distance values if the voxel happens to fall on rays between the several start-end point pairs.

The distances in a voxel can provide multiple estimates of the voxel's distance from the true landmark surface. The distances are averaged to get a single estimate of the voxel's distances from the true landmark surface. Specifically, in one embodiment, the distances are truncated to a maximum value, grouped into bins and a weighted average is computed. These averaged distances considered together for all voxels constitute the signed distance field and the landmark surface is obtained as its zero level-set. That is all voxels with a signed distance close to zero are taken to constitute the landmark surface.

Once the landmark surface voxels are identified, the coordinates of the voxel centers are used to compute the following properties for each landmark: (i) Centroid: Computed as the centroid of all surface voxels; (ii) Principal Axes: Obtained by a Principal Components Analysis (PCA) on the voxels' center coordinates; (iii) Axes Dimensions: Proportional to the variance along each axis and also obtained as a result of PCA; (iv) Radius: Determined by fitting a vertical cylinder to the landmark surface and using the cylinder's radius. These properties along with the voxel coordinates describing the landmark surface are considered the landmark's description.

In surveying mode, the landmark's description is written to disk (i.e., the survey landmark DB 216) when the landmark is no longer in the camera's field of view and the landmark is in the outer region of the local 3D map. In other words, the landmark's description is written to disk when the attribute InOuter is TRUE and the attributes InFOV and Saved are FALSE. Once the landmark is written to disk, the attribute Saved is set to TRUE so the landmark is not written to disk again. In one embodiment, the landmark's description is written to the description file 130. FIG. 5 illustrates a UML diagram of an exemplary description file 506 including attributes, attribute types, and associated functions.

In one embodiment, before the landmark's description is written to disk, all three-dimensional coordinates are converted to latitude, longitude and altitude using the vehicle's six degrees of freedom (i.e., 6DOF) pose available from the high quality position determination unit 140 (i.e., the GPS 136 and the IMU 138; the vehicle global pose 204). For example, let $(x_p, y_p, z_p)^T$ be the position of a point in the vehicle's coordinate frame. Let $(l, \lambda, \alpha, \theta, \emptyset, \phi)^T$ be the vehicle's latitude, longitude, altitude, yaw, pitch, and roll, as given by the GPS 136 and the IMU 138. Then the GPS coordinates of the point $(l_p, \lambda_p, \alpha_p)$ are estimated by:

$$\begin{pmatrix} x'_p \\ y'_p \end{pmatrix} = \begin{pmatrix} \cos\theta & -\sin\theta \\ \sin\theta & \cos\theta \end{pmatrix} \begin{pmatrix} x_p \\ y_p \end{pmatrix} \quad (1)$$

$$l_p = l + x'_p / 111111$$

$$\lambda_p = \lambda + y'_p / (111111 * \cos l)$$

$$\alpha_p = z_p$$

The description file 130 is tagged (e.g., by the processor 104) with the landmark's centroid's latitude and longitude. Further, a key file 132 is generated that contains the latitude and longitude centroids of each landmark. This key file 132 is read into memory 106 by the processor 104 in localization mode and allows landmarks near the vehicle to be identified easily and for their associated files to be read in quickly. FIG. 5 illustrates a UML diagram of an exemplary key file 504 including attributes, attribute types and associated functions.

As discussed above, the surveying mode can be implemented as a service from a provider (e.g., a third party) or on the consumer side. In the case of a consumer, surveying mode can be implemented in a vehicle having a high quality GPS and IMU device, for example, the high quality position determination unit 140 of FIG. 1. Accordingly, surveying mode would follow similar steps as shown in FIG. 2 on the consumer side utilizing the high quality position determination unit 140.

III. Localization Mode

In localization mode, localization of the vehicle involves landmark matching and landmark transformation to compute and apply pose correction to the vehicle's path. To localize the vehicle in a global frame, the landmarks observed during localization mode are matched to the landmarks saved to disk during surveying mode.

A. Overview of Localization Mode

Figure 3:
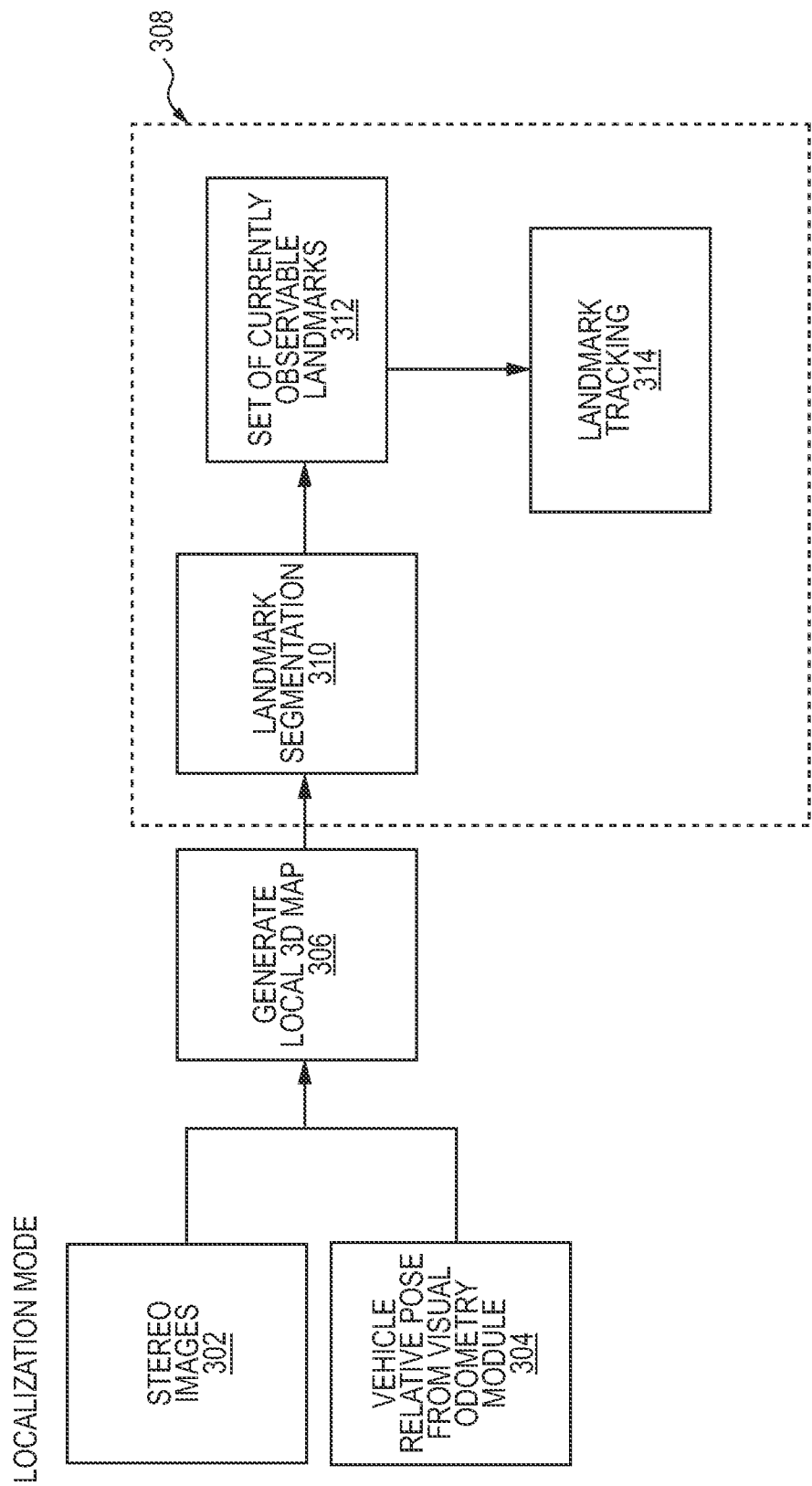
FIG. 3 is a schematic diagram of exemplary data flow of a localization mode in accordance with one aspect.
Figure 4:
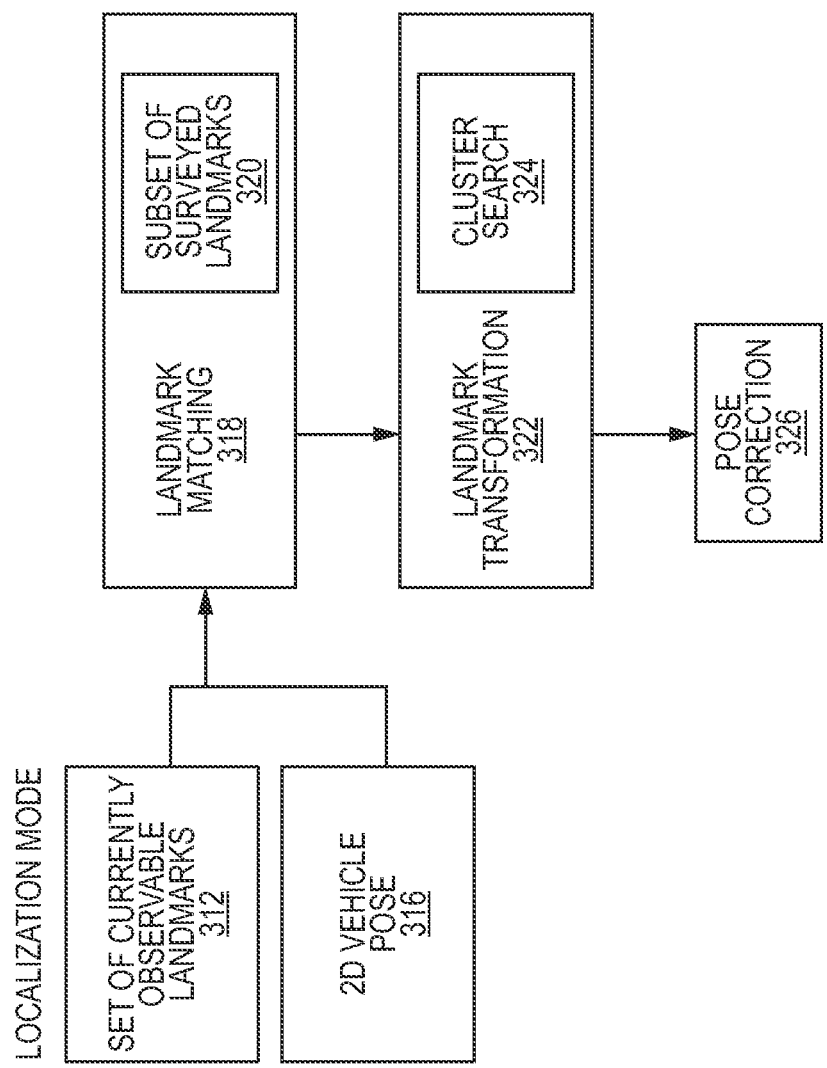
FIG. 4 is a schematic diagram of exemplary data flow of localization mode continued from FIG. 3 in accordance with one aspect.

FIGS. 3 and 4 are schematic diagrams of exemplary data flow during localization mode in accordance with one aspect. FIGS. 3 and 4 will now be described in detail with reference to FIGS. 1-2. In one embodiment, the visual odometry module 116 determines a vehicle relative pose along a travel route and a set of currently observable landmarks along the travel route relative to the vehicle relative pose. For example, as discussed above with FIGS. 1 and 2, stereo images 302 and a vehicle relative pose 304 (e.g., determined by the visual odometry module 116) are used to generate a local 3D map 306. The local 3D map 306 is processed using landmark segmentation 310 (e.g., as discussed with landmark segmentation 210 in FIG. 2), and results in a set of currently observable landmarks 312. Thus, the set of currently observable landmarks 312 are extracted from one or more stereo images 302 obtained from the imaging device 112.

Referring now to FIG. 4, the current position (e.g., the current weak global position) of the vehicle can be determined as a two-dimensional (2D) vehicle pose 316 using, for example, the low quality position determination unit 142. The 2D vehicle pose 316 provides at least latitude and a longitude of the vehicle's position. In some embodiments, the 2D vehicle pose 316 provides the vehicle's position with a standard deviation of about 10 m.

In one embodiment, at landmark matching 318, the survey landmark DB 126 is queried with the 2D vehicle pose 316 to identify a subset of surveyed landmarks 320 relative to the current position of the vehicle (i.e., the 2D vehicle pose 316). For example, the localization module 118 can generate a query including the current position of the vehicle and execute the query at the survey landmark DB 126 to retrieve a subset of surveyed landmarks 320 relative to the current position of the vehicle. In particular, in one embodiment, the localization module 118 can estimate the rough heading (yaw) of the vehicle in the global GPS frame by fitting a line to several of the past GPS readings. In one embodiment, the several past GPS readings are obtained from the low quality position determination unit 142 and saved, for example, in a memory (not shown) of the low quality position determination unit 142 and/or the memory 106 or the disk 108.

Let $(l_v, \lambda_v, \theta_v)$ give the vehicle's current 2D GPS pose 316 with the symbols denoting latitude, longitude, and the heading computed by line fitting, respectively. Utilizing the key file 132 generated during surveying mode, a subset of surveyed landmarks 320 is identified that are close to the vehicle's current location. Information associated with the subset of surveyed landmarks 320 from the description file 130 is also read. The GPS coordinates from the description file 130 are converted into Cartesian coordinates according to the vehicle's frame, using the vehicle's current 2D pose 316 as follows:

$$\begin{pmatrix} x_p \\ y_p \end{pmatrix} = \begin{pmatrix} \cos\theta_v & -\sin\theta_v \\ \sin\theta_v & \cos\theta_v \end{pmatrix} \begin{pmatrix} x'_p \\ y'_p \end{pmatrix} \quad (2)$$

$$x'_p = (l_v - l_p) * 111111$$

$$y'_p = (\lambda_v - \lambda_p) * (111111 * \cos l_v)$$

$$z_p = \alpha_p$$

where $(l_p, \lambda_p, \alpha_p)$ are the GPS coordinates of the landmark of the subset of surveyed landmarks 320 and $(x_p, y_p, z_p)^T$ is the position of the landmark of the subset of surveyed landmarks 320 in the vehicle's coordinate frame.

To compute the pose correction 326 to be applied to the vehicle's pose, one or more two-dimensional (2D) transforms are estimated between the subset of surveyed landmarks 320 and the set of currently observable landmarks 402 at landmark transformation 322. In one embodiment, the pose correction module 120 determines one or more two-dimensional transform estimates between the set of currently observable landmarks and the subset of surveyed landmarks.

The transforms are estimated in two-dimensions, however, in other embodiments, three-dimensional transforms can be estimated using landmark surfaces. To compute the 2D transform estimates, the landmark centroids and surfaces are projected to 2D (e.g., removing the z coordinate). These projections are defined as landmark signatures that describe the layout and structure of the landmark sets. The landmark signatures (not shown) are generated in rea-time and allow for fast and lightweight 2D matching.

Further, at landmark transformation 322, a best transform estimate is determined from the one or more 2D transform estimates using cluster searching 324, will be discussed in further detail below. In particular, the pose correction module 120 can identify a best transform from the one or more 2D transform estimates. In some embodiments, the best transform estimate minimizes distances between the set of currently observable landmarks 312 and the subset of surveyed landmarks 320.

After computing and selecting the best transform estimate as $(x_{2D}, y_{2D}, \theta_{2D})^T$ from the one or more 2D transform estimates, the vehicle's current 2D pose 316 is applied to get the corrected pose as follows:

$$l'_v = (l_v + x_{2D})/111111 \quad \lambda'_v = (\lambda_v - y_{2D})/(111111 * \cos l_v)$$
$$\theta'_v = \theta_v + \theta_{2D} \quad (3)$$

where $(l'_v, \lambda'_v, \theta'_v)^T$ is the vehicle's final corrected pose 326. Accordingly, utilizing a lightweight 3D local map of the vehicle's environment built with dense stereo depth data, two sets of landmarks and refined transform estimates, pose correction of the vehicle's path is accurate and fast.

B. Determining One or More 2D Transform Estimates and Identifying a Best Transform Estimate As discussed above, to compute pose correction, one or more two-dimensional (2D) transform estimates between the set of currently observable landmarks 312 and the subset of surveyed landmarks 320 are determined at landmark transformation 322. The one or more two-dimensional transform estimates are 2D rigid-body transformations. 2D rigid-body transformations consist of a single rotation and a 2D translation. Specifically, a transformation in an X offset, Y offset and rotational direction.

Generally, 2D transform estimates are derived by estimating one or more 2D transform estimates at one or more transform scales in a discrete bounded space for a depth level N, selecting one or more best transform estimates for the depth level N and modifying the discrete bounded space based on the one or more best transform estimates. This process can continue by estimating one or more 2D transform at a one or more transform scales in the discrete bounded space for each depth level N out of a maximize depth level N.

The one or more transform scales progress from coarse transform scales to fine transform scales. Thus, the one or more transform scales are, in some embodiments, at a finer level of detail (e.g., finer level of movements) than the previous transform scale. For example, at a first transform scale, the one or more 2D transform estimates may begin as coarse movements (e.g., 1 m increments). At a second transform scale, the 2D transform estimates are finer movements than the coarse movements of the first movement scale (e.g., ½ m increments). It is understood that more than two transform scales can be used to estimate one or more 2D transform estimates.

Landmark transformation 322 and cluster search 324 will now be described in detail with references to FIGS. 8A-8F. FIGS. 8A, 8B and 8C are schematic diagrams of exemplary grid and tree searches for a best transform estimate at varying transform scales with a single estimate (i.e., a branch factor of 1) for each depth level N, where the maximum depth level N is 3 (i.e., FIG. 8A, N=1; FIG. 8B, N=2; FIG. 8C; N=3). It is appreciated that any number of branch factors and depth levels can be implemented. Referring now to FIG. 8A, one or more 2D transform estimates are estimated in a discrete bounded space defined by the grid 800. The one or more 2D transforms estimates are estimated at one or more transform scales. The transform scales progress from coarse transform scales to fine transform scales. In one embodiment, the transform scales progress by a set number, for example, in 45 degree increments and translations in 1 meter increments.

As an illustrative example, the one or more 2D transform estimates can be estimated at a first transform scale, for example, using coarse movements. For example, coarse movements can include rotations in 45-degree increments and translations with 1-meter increments. In another example, the one or more 2D transform estimates can be estimated at a second transform scale. The second transform scale is for example, a finer scale or finer movements, than the first transform scale. Thus, for example, the one or more 2D transform estimates at the second transform scale can include rotations in 25-degree increments and translations with ½ meter increments.

At each depth level N, a best transform estimate is determined. In one embodiment, a transform score and/or a transform cost is determined for each of the one or more 2D transform estimates. In one embodiment, the score and/or cost is based on a measurement of distance between the set of currently observable landmarks 312 and the subset of surveyed landmarks 320 after applying the 2D transform. For example, in one embodiment, the closer (i.e., a minimized distance between landmarks, a minimized distance between centroids) the set of currently observable landmarks 312 and the subset of surveyed landmarks 320 after applying the 2D transform, the better the transform estimate and the lower the cost and/or score. For example, a score or cost of zero would be a perfect transformation.

In another embodiment, the measurement of distance can be any norm applied to a set of distances. For example, in one embodiment, the score and/or cost is determined based on the square root of the mean squared difference between corresponding points of the set of currently observable landmarks 312 and the subset of surveyed landmarks 320 after applying the 2D transform. Accordingly, for each 2D transform estimate, a score is determined and assigned to the 2D transform estimate.

Accordingly, the best transform estimate for a depth level K can be determined based on a transform cost associated with each of the one or more 2D transform estimates. In one embodiment, the discrete bounded space is modified based on the best transform estimate for the depth level K. Referring again to FIG. 8A, a best estimate 802 is selected in an area 804 of the grid 800. Thus, in FIG. 8B, the area 804 becomes the discrete bounded space for determining one or more 2D transform estimates.

Similar to the discussion of FIG. 8A, one or more 2D transforms in FIG. 8B are estimated at one or more transform scales for the depth level K++ (2). The best transform estimate for the depth level K++ (2) can be determined based on a transform cost associated with each of the one or more 2D transform estimates. In one embodiment, the discrete bounded space is modified based on the best transform estimate for the depth level K++ (2).

In FIG. 8B, a best estimate 806 is selected in the discrete bounded space 804. Accordingly, the discrete bounded space is redefined to the area 810 around the best estimate 806. Thus, in FIG. 8C, one or more 2D transform estimates are restricted to the area 810 (i.e., the redefined discrete bounded space). The one or more 2D transforms in FIG. 8C are estimated at one or more transform scales for the depth level K++ (3). The best transform estimate for the depth level K++ (3) can be determined based on a transform cost associated with each of the one or more 2D transform estimates. In FIG. 8C, a best estimate 812 is selected in the area 810 (e.g., the discrete bounded space).

It is appreciated that the process described above can be reiterated for a predetermine number of depth levels K and/or 2D transform estimates. Further, the process can be carried out for more than one best transform estimate. For example, FIGS. 8A, 8B and 8C are schematic diagrams of exemplary grid searches for a best transform estimate at varying levels with more than one estimate (e.g., a branch factor of more than one) instead of a single estimate as shown in FIGS. 8D, 8E and 8F.

In one embodiment, once the best transform estimates are determined for each depth level N to a maximum depth level N, a sorted list is generated containing the best transform estimates for each depth level N and sorted based on the transform cost determined for each of the best transform estimates for each depth level N. Thus, referring to FIGS. 8A, 8B and 8C with a maximum depth level N of three and a branching factor of one, the sorted list would include three best transform estimates, one for each depth level N. Stated differently, the best transform estimates evaluated include a branching factor N multiplied by the maximum depth level K. Referring to FIGS. 8D, 8E and 8F with a maximum depth level N of three and a branching factor of two, the sorted list would include nine best transform estimates, two for each depth level N.

Figures 9A, 9B:
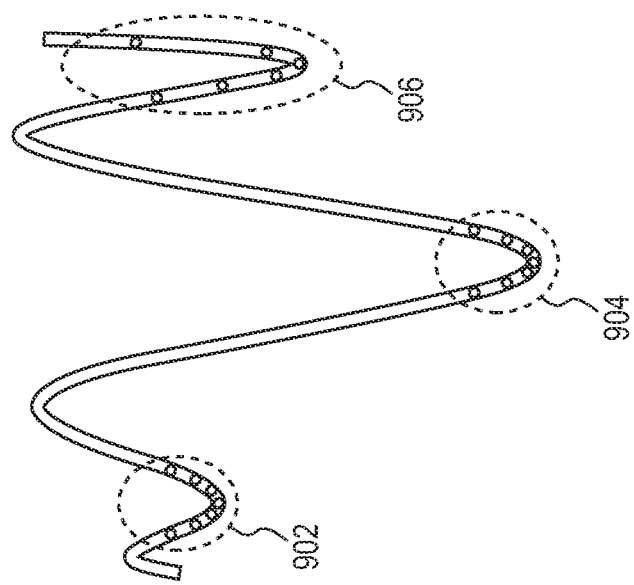
FIG. 9A is a schematic diagram of an exemplary sorted list in accordance with one aspect.
FIG. 9B is a schematic diagram of an exemplary set of clusters in accordance with one aspect.

FIG. 9A illustrates an exemplary sorted list 900 generated with the best transform estimates for each depth level N. In FIG. 9A, the first column of the sorted list 900 identifies the best estimate for a depth level N and the second column identifies the transform cost associated with the best estimate for the depth level N. The maximum depth level in FIG. 9A is six with a branching factor of one; however, it is appreciated that any maximum depth level or any number of branching factors can be implemented. In FIG. 9A, the best transform estimates are sorted from lowest transform cost to highest transform cost.

In one embodiment, each best transform estimate in the sorted list is compared to an adjacent best transform estimate. This can be accomplished by iterating through the sorted list from lowest transform cost to highest transform cost. If a significant difference (e.g., a difference >a predetermined number) is determined between the transform costs, a cluster is generated including the best transform estimate. Said differently, a new cluster can be designated when there is a significant difference in score (e.g., two scores differ by 50%).

Referring again to FIG. 9A, $B_{N1}$ would be compared to $B_{N5}$, $B_{N3}$ would be compared to $B_{N6}$ and so forth until the end of the sorted list is reached. In one illustrative example, the predetermined difference is set to five. Thus, in FIG. 9A, if the difference between a best transform estimate and an adjacent transform estimate is greater than five, a cluster is generated. As an illustrative example, $B_{N3}$ is compared to $B_{N6}$ (i.e., 20−6=14). Since the difference between $B_{N3}$ and $B_{N6}$ is 14, a cluster division is inserted between $B_{N3}$ and $B_{N6}$ Therefor a first cluster includes $B_{N1}$, $B_{N5}$ and $B_{N3}$. Assuming another cluster division is not determined, a second cluster includes $B_{N6}$, $B_{N3}$, and $B_{N4}$.

FIG. 9B is a schematic diagram of an exemplary set of clusters in accordance with one aspect. For example, clusters 902, 904 and 906 each include a plurality of 2D transform estimates based on the iterative comparison described above. Referring to the example of FIG. 9A and the diagram of FIG. 9B, the first cluster could be cluster 902 and the second cluster could be cluster 904.

In one embodiment, a cluster is assigned a score based on its best estimate. In one embodiment, a best estimate is that with the lowest score. Referring again to the example of FIG. 9A, the first cluster would be assigned the score associated with $B_{N1}$ since two is the lowest transform score in the first cluster. Similarly, the second cluster would be assigned the score associated with $B_{N6}$ since 20 is the lowest transform score in the second cluster. Referring to FIG. 9B, each cluster 902, 904 and 906 is assigned a score based on the best estimate of the plurality of 2D transforms in that cluster.

Accordingly, in one embodiment, a pose correction is applied based on the best transform estimate as determined by each cluster. Thus, the best transform estimate (e.g., a best cluster transform estimate) is selected based on the best transform estimate of each cluster. This best cluster transform estimate can be used to apply a pose correction to the vehicle. As an illustrative example, cluster A is better than cluster B if the best estimate in cluster A is better (e.g., lower) than the best estimate in cluster B. Thus, referring to the example of FIG. 9A, since best transform estimate of the first cluster is two is lower the best transform estimate of the second cluster is 20, the best cluster transform estimate is 2 and this transform estimate can be applied to pose correction of a vehicle.

C. Methods for Mapping, Localization and Pose Correction

Figure 6:
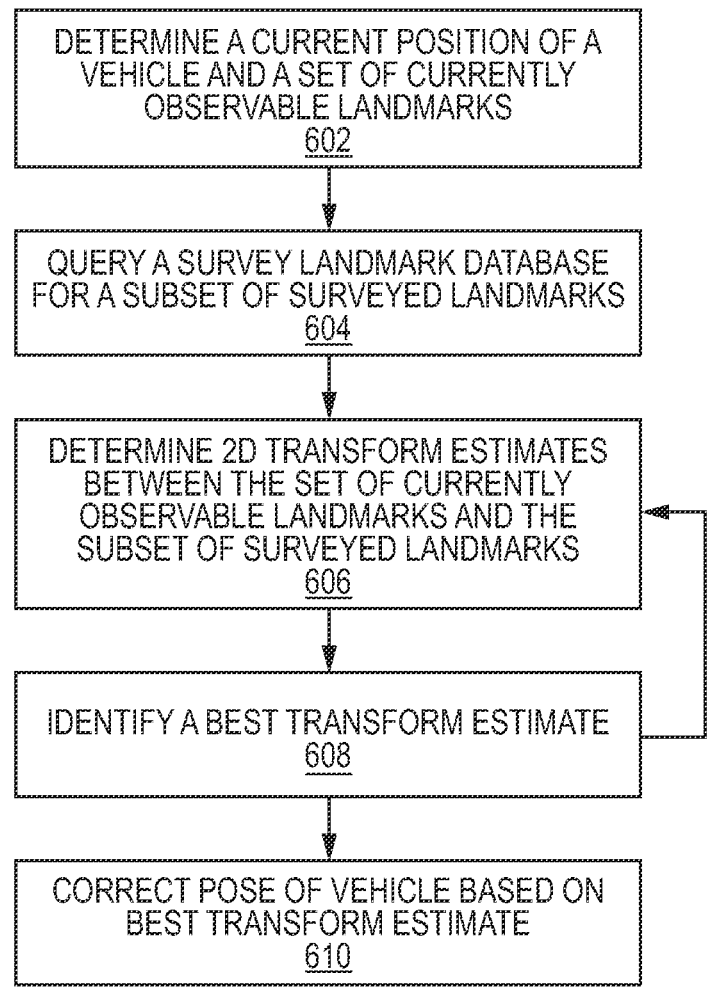
FIG. 6 is a process flow diagram of an exemplary method for mapping, localization and pose correction in accordance with one aspect.

The system 100 illustrated in FIGS. 1-5 described above will now be described with reference to the method of FIG. 6. It will be appreciated that the systems and components discussed above in FIGS. 1-5 may similarly be implemented with the method of FIG. 6. The method of FIG. 6 illustrates an exemplary method for mapping, localization and pose correction according to one aspect. At block 602, the method includes, determining a current position of a vehicle along a travel route and a set of currently observable landmarks along the travel route relative to the current position. The set of currently observable landmarks are extracted from one or more stereo images obtained from an imaging device. For example, the position determination unit 110 of FIG. 1 can obtain a current position of a vehicle along a travel route, specifically, the low quality position determination unit 142. The current position of the vehicle can be a two-dimensional (2D) vehicle pose (e.g., at least the latitude and the longitude of the vehicle's position). The set of currently observable landmarks are determined, for example, by the visual odometry module 116, by extracting the set of currently observable landmarks from one or more stereo images obtained from the imaging device 122 and a 3D local map, as discussed above with FIG. 3.

Referring now to block 604, the method includes, querying a survey landmark DB to identify a subset of surveyed landmarks relative to the current position of the vehicle. For example, in one embodiment, the localization module 118 generates and transmits (and/or executes) a query to the survey landmark DB 126. The query can include the current position of the vehicle. The survey landmark DB 126 includes a set of surveyed landmarks previously stored (e.g., the set of surveyed landmarks previously stored 417 of FIG. 4).

In one embodiment, after receiving and executing the query, the survey landmark DB 126 returns to the localization module 118 a subset of surveyed landmarks relative to the current position of the vehicle. The survey landmark DB 126, in one embodiment, can execute the query using data read from the description file. The description file can include coordinates of each landmark in the set of surveyed landmarks previously stored. Thus, the coordinates of each landmark are compared to the current position of the vehicle to determine the subset of surveyed landmarks. Accordingly, the subset of surveyed landmarks includes landmarks stored in the survey landmark DB 416 near the current position of the vehicle. It is appreciated that in some embodiments, the localization module 118 can read the description file from the survey landmark DB 416 and execute the query at the localization module 118.

At block 606, the method includes, determining one or more two-dimensional transform estimates between the set of currently observable landmarks and the subset of surveyed landmarks. Determining one or more two-dimensional transform estimates will be described in further detail with FIG. 7 below. In one embodiment, the pose correction module 120 determines one or more two-dimensional transform estimates between the set of currently observable landmarks and the subset of surveyed landmarks.

Further, in one embodiment, the method at block 608 includes determining a centroid of each landmark of the set of currently observable landmarks. The subset of surveyed landmarks, as discussed above, also includes a centroid for each landmark in the subset of surveyed landmarks. For example, as discussed above, the description file 130 and/or the key file 132 can include information (e.g., position) of the centroid for each landmark in the subset of surveyed landmarks.

Accordingly, in one embodiment, determining one or more two-dimensional transform estimates comprises projecting a centroid of each landmark of the subset of surveyed landmarks and a centroid of each landmark of the set of currently observable landmarks into two-dimensions. For example, as discussed above, in one embodiment, the landmark centroids and surfaces are projected to 2D by removing, for example, the z coordinate. These projections can be defined as landmark signatures that describe the layout and structure of the landmark sets.

At block 608, the method includes, identifying a best transform estimate from the one or more two-dimensional transform estimates. In one embodiment, the best transform estimate minimizes distances between the set of currently observable landmarks and the subset of surveyed landmarks. In another embodiment, the best transform estimate minimizes corresponding centroid distances between the set of currently observable landmarks and the subset of surveyed landmarks.

At block 610, the method includes correcting a pose of the vehicle based on the best transform estimate. For example, as discussed above with equation (3), the best transform estimate is applied to the vehicle current position, for example, the current position of the vehicle along the travel route determined at block 602. In some embodiments, the current position of the vehicle is a 2D pose. In the system 100 of FIG. 1, the pose correction module 120 corrects the pose of the vehicle based on the best transform estimate.

Figure 7:
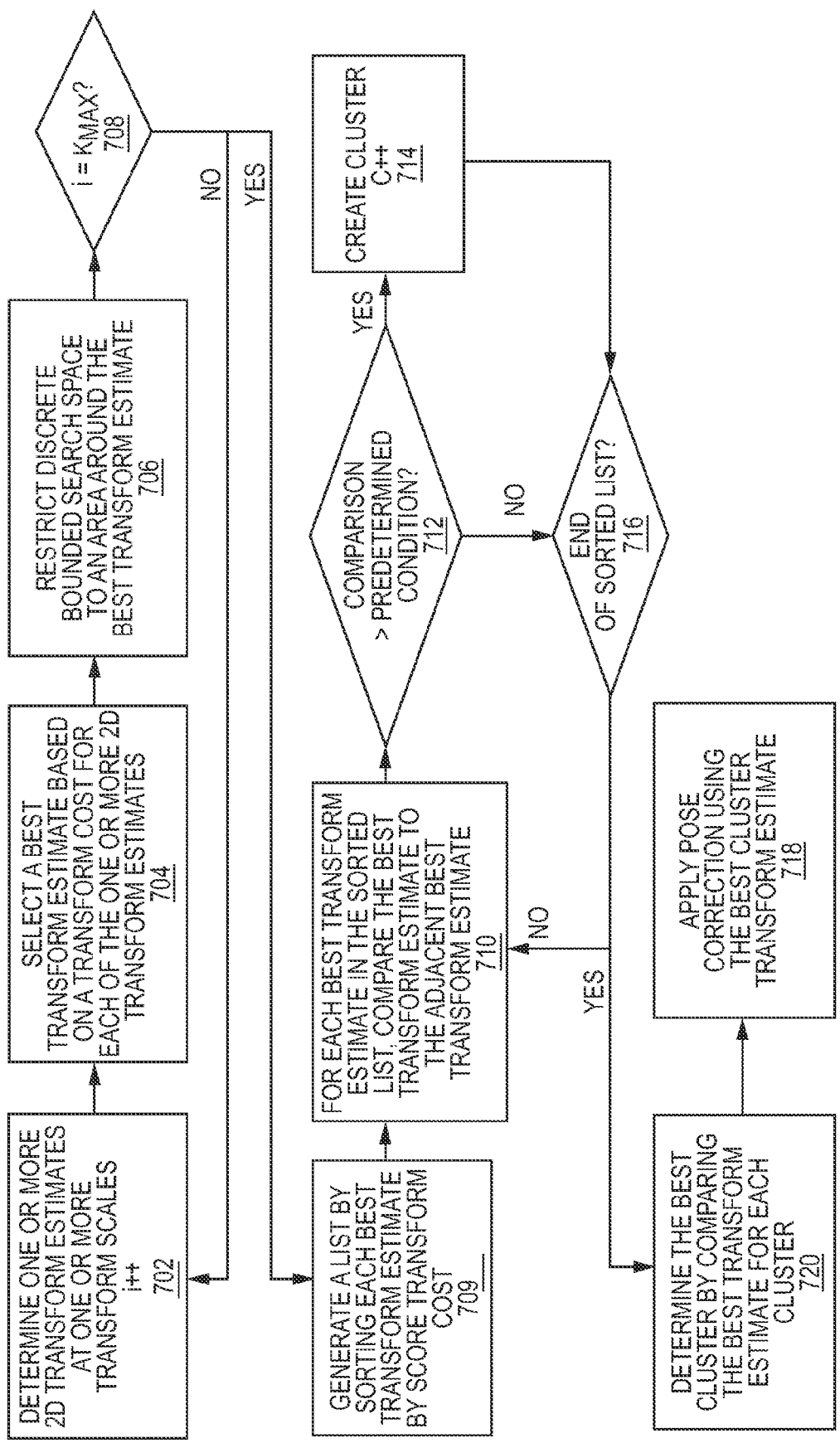
FIG. 7 is a process flow diagram of an exemplary method for determining one or more two-dimensional transforms of the method of FIG. 6 according to one aspect.

Determining one or more two-dimensional transform estimates and identifying a best transform estimate will now be discussed in detail with reference to FIG. 7. FIG. 7 is a process flow diagram of an exemplary method for determining one or more two dimensional transforms of FIG. 6 according to one aspect. FIG. 7 will be described with reference to the components and functions of FIGS. 1-5.

At block 702, and as discussed above, the method includes determining one or more 2D transform estimates. In one embodiment, the processor 104 maintains a counter i for each iteration of depth levels N in the method of FIG. 6. Accordingly, at block 702 the method can include incrementing the counter i. In one embodiment, determining one or more two-dimensional transform estimates includes determining one or more two-dimensional transform estimates at one or more transform scales between the set of currently observable landmarks and the subset of surveyed landmarks in a discrete bounded space for a depth N. As discussed above with FIGS. 8A-8F, the one or more transform scales progress from coarse transform scales to fine transform scales.

In another embodiment, determining one or more two-dimensional transform estimates includes determining one or more two-dimensional transforms estimates at a first transform scale between the set of currently observable landmarks and the subset of surveyed landmarks in a discrete bounded space. The first transform scale, as discussed above, can be coarse scale transforms. Further, in this embodiment, determining one or more two-dimensional transform estimates includes determining one or more two-dimensional transforms estimates at a second transform scale between the set of currently observable landmarks and the subset of surveyed landmarks in a discrete bounded space. The second transform scale is a transform scale at a finer level of detail than the previous scale (e.g., the first transform scale).

At block 704, the method can include determining a transform cost for each of the one or more 2D transform estimates at a depth level K. Further, a best transform estimate can be determined based on the transform cost of each of the one or more 2D transform estimates at the depth level K. As discussed above, the best transform estimate, in one embodiment, can be the 2D transform estimate with the lowest transform cost. At block 706, the discrete bounded search space is modified to an area around the best transform estimate. In some embodiments, at block 708, it can be determined if i is equal to a maximum number K of depth levels. If no, the method proceeds back to block 702 and one or more 2D transform estimates at one or more transform scales are determined at a next depth level K.

If the determination at block 708 is yes, the method proceeds to block 709. At block 709, the method includes generating a sorted list of best transform estimates at each depth level N based on a transform cost of the one or more two-dimensional transform estimates at each depth level N. As discussed above with FIG. 9A, the sorted list can be sorted from lowest to highest transform score.

The sorted list is iterated to determine one or more clusters. Specifically, the method includes determining one or more clusters of best transform estimates based on comparing each best transform estimate in the sorted list to an adjacent best transform estimate in the sorted list. More specifically, at block 710, for each best transform estimate in the sorted list, the best transform estimate is compared to an adjacent best transform estimate (e.g., score s is compared to score s++).

At block 712, it is determined if the difference between the best transform estimate and the adjacent best transform estimate is a significant difference (e.g., a difference >a predetermined number). Said differently, a new cluster can be designated when there is a significant difference in transform costs (e.g., two transform costs differ by 50%). Thus, if the determination at block 712 is yes, a new cluster is generated at block 714. In some embodiments, at block 712, a counter c is maintained by the processor 104 to maintain a number of clusters. If the determination at block 712 is no, the method continues to block 716. A block 716, it is determined if the end of the sorted list has been reached. If the determination at block 716 is no, the method continues to iterate through the sorted list at block 710. If the determination at block 716 is yes, the method continues to block 720.

At block 720, the method includes determining a best cluster transform estimate based on the best transform estimates of each of the one or more clusters. As discussed above with FIGS. 9A and 9B, a cluster is assigned a score based on its best estimate. In one embodiment, a best estimate is that with the lowest score. Thus, the best transform estimate (e.g., a best cluster transform estimate) is selected based on the best transform estimate of each cluster. This best cluster transform estimate can be used to apply a pose correction to the vehicle. As an illustrative example, cluster A is better than cluster B if the best estimate in cluster A is better (e.g., lower) than the best estimate in cluster B. Accordingly, based on the best cluster transform estimate, a pose correction is applied at block 718.

IV. Illustrative Examples

Figure 10A:
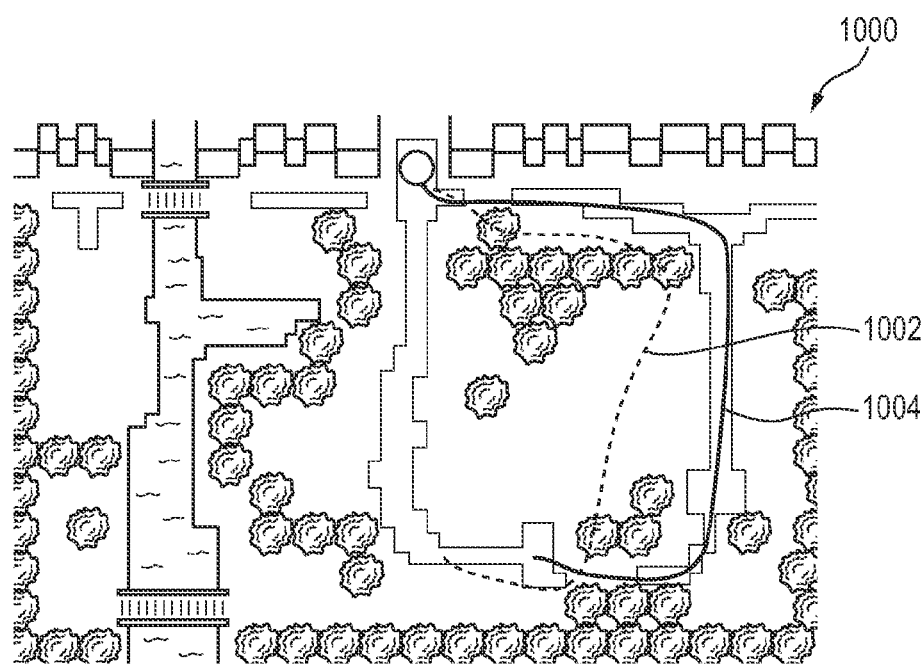
FIG. 10A is a schematic view of a map prior to applying pose correction according to one aspect.

An illustrative example implementing the systems and methods for mapping, localization and pose correction in a vehicle will now be described. FIG. 10A is schematic view of map 1000 prior to applying pose correction. Line 1002 illustrates a travel path determined by a visual odometry system of a vehicle, for example, the visual odometry module 116. Line 1004 illustrates a travel route actually driven by the vehicle (i.e., a true path). Utilizing the methods and systems described above for mapping, localization and pose correction, the travel path 1002 and the travel route 1004 can be reconciled to determine a correct travel path for a vehicle.

Figure 10B:
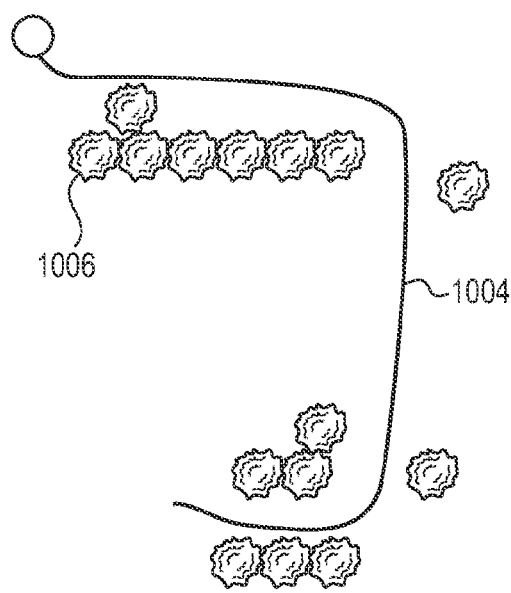
FIG. 10B is a simplified view of the map of 10A showing landmarks witnessed along a true path.
Figure 10C:
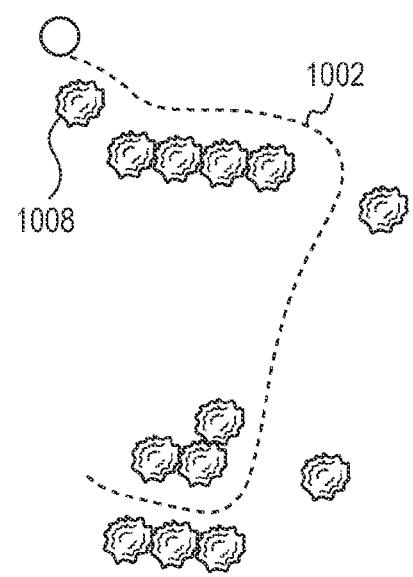
FIG. 10C is a simplified view of the map of 10A showing landmarks witnessed along a travel path determined by a visual odometry system of a vehicle.

FIG. 10B is a detailed view of the map 1000 of FIG. 10A illustrating the landmarks 1006 witnessed along the true travel route, line 1004. These landmarks 1006 are a set of currently observable landmarks. FIG. 10C is a detailed view of the map 1000 of FIG. 10A illustrating the landmarks 1008 witnessed along the travel path determined by the visual odometry system, line 1002.

Figure 11:
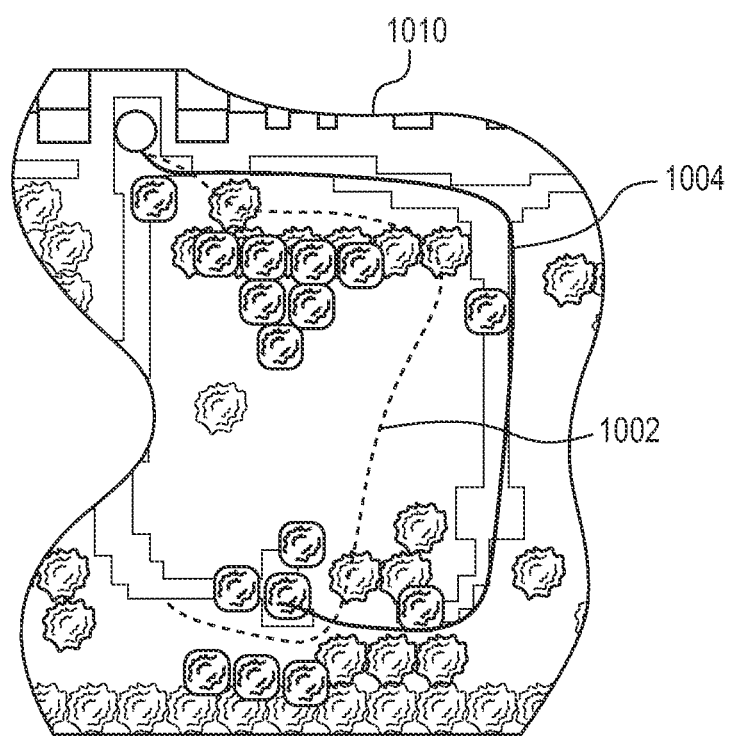
FIG. 11 is a view of the map of FIG. 10A showing the results of a query for landmarks witnessed along a travel path determined by a visual odometry system of a vehicle.

FIG. 11 illustrates a view of the map 1000 showing the results of a query executed on a survey landmark database (e.g., the survey landmark database 126) to identify a subset of surveyed landmarks relative to the current position of the vehicle. The results of the query, the subset of surveyed landmarks, are each represented by rounded square shapes in FIG. 11.

Figure 12A:
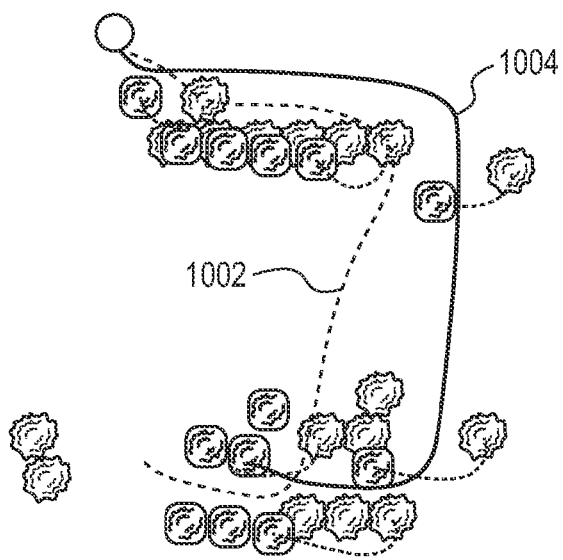
FIG. 12A is a simplified view of the map of FIG. 10A showing one or more 2D transforms.
Figure 12B:
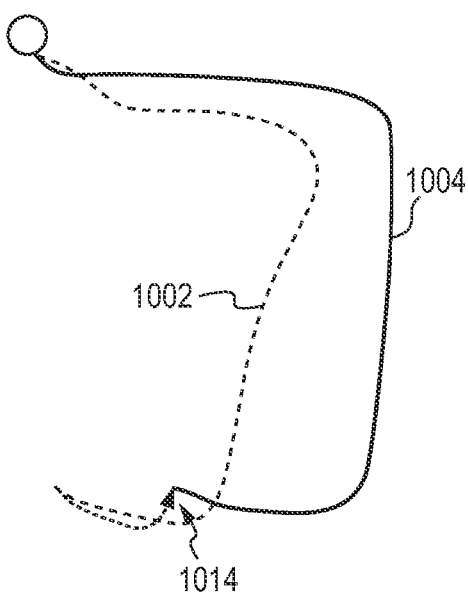
FIG. 12B is a simplified view of the map if FIG. 10A showing a best transform estimate.
Figure 12C:
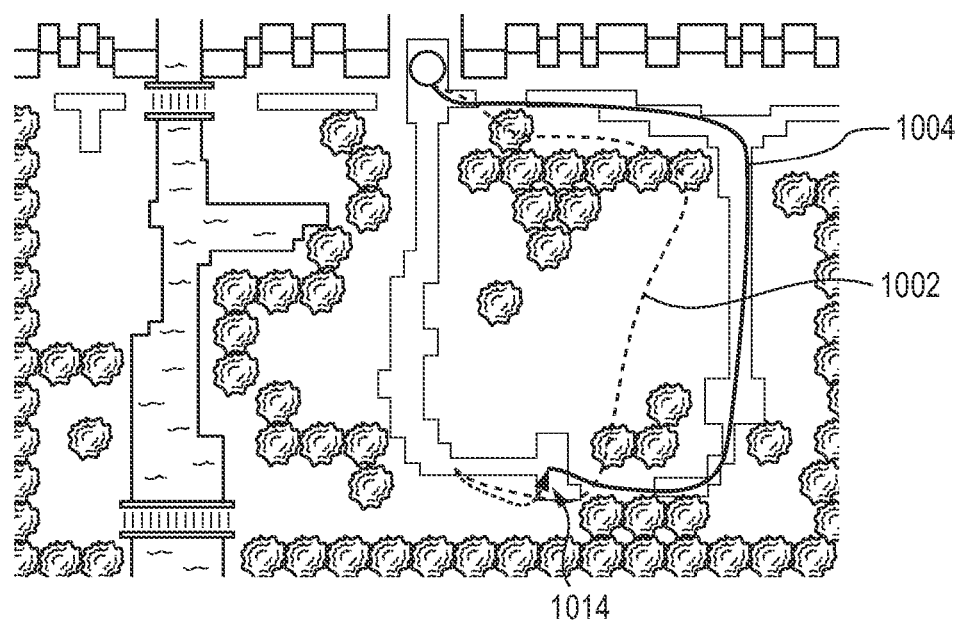
FIG. 12C is a simplified view of the map if FIG. 10A showing a best transform estimate with landmarks.
Figure 13:
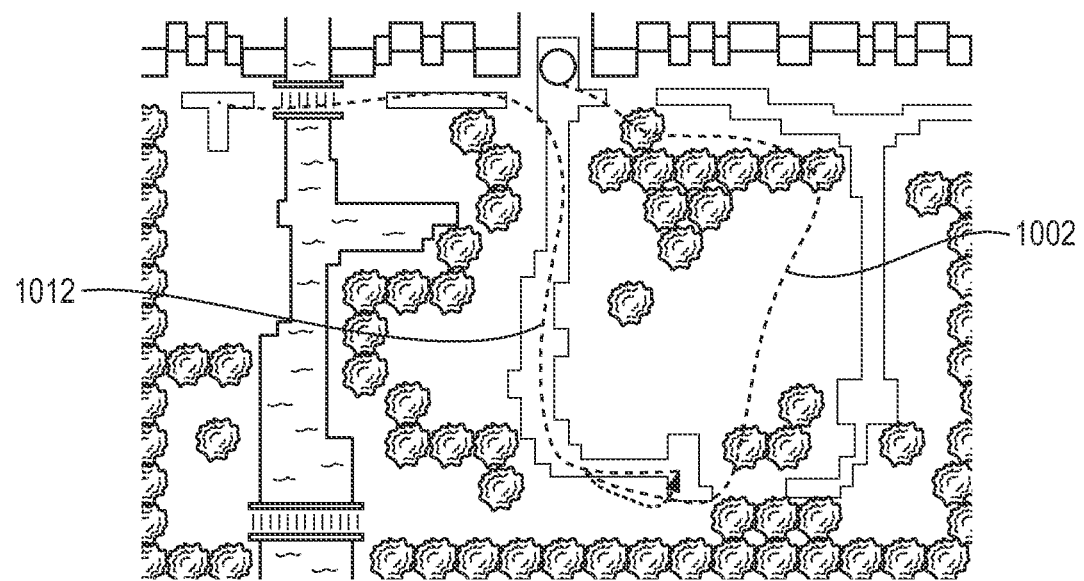
FIG. 13 is view of the map of FIG. 10A where the best transform estimate is applied to the current position of the vehicle.

FIG. 12A is an illustrative example of determining one or more 2D transforms between the set of currently observable landmarks 1006 (i.e., from FIG. 10B) and the subset of surveyed landmarks (e.g., represented by rounded square shapes). In FIG. 12B, a best transform estimate 1014 is selected. In FIG. 12C, the best transform estimate is shown with respect to the map 1000 of FIG. 10A. In FIG. 13, the best transform estimate is applied to the current position of the vehicle, resulting in a new route 1012.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for mapping, localization and pose correction, comprising:
   determining a current position of a vehicle along a travel route and a set of currently observable landmarks along the travel route relative to the current position, the set of currently observable landmarks extracted from one or more stereo images obtained from an imaging device;
   querying a survey landmark database to identify a subset of surveyed landmarks relative to the current position of the vehicle, the survey landmark database comprising a set of surveyed landmarks previously stored;
   determining one or more two-dimensional transform estimates between the set of currently observable landmarks and the subset of surveyed landmarks including determining one or more two-dimensional transform estimates at one or more transform scales between the set of currently observable landmarks and the subset of surveyed landmarks in a discrete bounded space, wherein the one or more two-dimensional transform estimates are determined for each depth level N, wherein N is a maximum number of depth levels;
   identifying a best transform estimate from the one or more two-dimensional transform estimates that minimizes distances between the set of currently observable landmarks and the subset of surveyed landmarks, wherein identifying the best transform estimate includes determining a transform cost of the one or more two-dimensional transform estimates at each depth level N, generating a sorted listed of best transform estimates at each depth level N based on the transform cost of the one or more two-dimensional transform estimates at each depth level N, and identifying the best transform estimate by comparing each best transform estimate in the sorted list to an adjacent best transform estimate in the sorted list; and
   correcting a pose of the vehicle based on the best transform estimate.

2. The computer-implemented method of claim 1, comprising determining a centroid of each landmark of the set of currently observable landmarks and wherein the subset of surveyed landmarks comprises a centroid for each landmark in the subset of surveyed landmarks.

3. The computer-implemented method of claim 2, wherein determining one or more two-dimensional transform estimates comprises projecting the centroid of each landmark of the subset of surveyed landmarks and the centroid of each landmark of the set of currently observable landmarks into two-dimensions.

4. The computer-implemented method of claim 3, wherein the best transform estimate minimizes corresponding centroid distances between the set of currently observable landmarks and the subset of surveyed landmarks.

5. The computer-implemented method of claim 1, wherein the one or more transform scales progress from coarse transform scales to fine transform scales.

6. The computer-implemented method of claim 1, wherein identifying the best transform estimate by comparing each best transform estimate in the sorted list to an adjacent best transform estimate in the sorted list includes determining one or more clusters of best transform estimates based on comparing each best transform estimate in the sorted list to the adjacent best transform estimate in the sorted list.

7. The computer-implemented method of claim 6, including determining a best cluster transform estimate based on the best transform estimates of each of the one or more clusters and wherein correcting a pose of the vehicle is based on the best cluster transform estimate.

8. A system for mapping, localization and pose correction, comprising:
   a processor; and
   a memory operatively connected for computer communication to the processor, the memory storing a visual odometry module, a localization module, and a pose correction module with instructions for execution by the processor, wherein:
   the visual odometry module causes the processor to determine a current position of a vehicle along a travel route and a set of currently observable landmarks along the travel route relative to the current position, the set of currently observable landmarks extracted from one or more stereo images obtained from an imaging device communicatively coupled to the processor;
   the localization module causes the processor to query a survey landmark database communicatively coupled to the processor to retrieve a subset of surveyed landmarks relative to the current position of the vehicle, the survey landmark database including a set of surveyed landmarks previously stored; and
   the pose correction module causes the processor to determine one or more two-dimensional transform estimates between the set of currently observable landmarks and the subset of surveyed landmarks, identify a best transform estimate from the one or more two-dimensional transform estimates that minimizes distances between the set of currently observable landmarks and the subset of surveyed landmarks, wherein identifying the best transform estimate includes the pose correction module causing the processor to generate a sorted list of best transform estimates based on a transform cost of each estimate and determine one or more clusters of the best transform estimates based on comparing each best transform estimate in the sorted list to an adjacent best transform estimate in the sorted list, and wherein the pose correction module causes the processor to correct a pose of the vehicle based on the best transform estimate.

9. The system of claim 8, wherein the localization module determines a centroid of each landmark of the set of currently observable landmarks and wherein the subset of surveyed landmarks comprises a centroid for each landmark in the subset of surveyed landmarks.

10. The system of claim 9, wherein the pose correction module identifies the best transform estimate as a transform estimate that minimizes corresponding centroid distances between the set of currently observable landmarks and the subset of surveyed landmarks.

11. The system of claim 8, wherein the pose correction module determines a set of transform estimates between the set of currently observable landmarks and the subset of surveyed landmarks based on a two-dimensional scale transform at one or more transform scales, wherein the one or more transform scales progress from coarse transform scales to fine transform scales.

12. The system of claim 8, wherein the pose correction module determines a best cluster transform estimate based on the best transform estimates of each of the one or more clusters and corrects a pose of the vehicle is based on the best cluster transform estimate.

* * * * *